United States Patent

Komai et al.

Patent Number: 5,834,685
Date of Patent: Nov. 10, 1998

[54] GAS GENERATOR COMPOSITION WITH AZIDOMETHYL GROUP AND IRON COMPOUND MODIFIER

[75] Inventors: Iwao Komai, Handa; Goro Nakashita; Kazushige Kato, both of Aichi-ken, all of Japan

[73] Assignee: NOF Corporation, Tokyo, Japan

[21] Appl. No.: 640,490

[22] Filed: May 1, 1996

[30] Foreign Application Priority Data

May 10, 1995 [JP] Japan ................................ 7-112105

[51] Int. Cl.$^6$ ............................. C06B 45/10; C08G 18/08
[52] U.S. Cl. ................................. 149/19.91; 528/55
[58] Field of Search ............... 149/19.91; 526/55

[56] References Cited

U.S. PATENT DOCUMENTS

H1459 7/1995 Lawrence ................ 149/19.4
4,925,909 5/1990 Kubota et al. ............... 528/55

Primary Examiner—Peter A. Nelson
Attorney, Agent, or Firm—Vidas, Arrett & Steinkraus

[57] ABSTRACT

A gas generator composition is provided which burns stably and has a high burning rate at low temperature ranges while maintaining its performance such as specific impulse when used in the propulsive engine. Furthermore, a gas generator composition whose dependence on pressure and temperature is small is provided. The gas generator comprises an aliphatic polyether having azidomethyl groups and hydroxyl groups, a curing agent for curing the aliphatic polyether, an oxidizer for conducting oxidation reaction, and a burning rate modifier for modulating the burning rate based on the oxidation reaction. As the aliphatic polyether a bifunctional or polyfunctional compound having a particular structure is employed. As the curing agent a polyfunctional isocyanate compound or polyisocyanate compound is employed. As the oxidizer a perchlorate such as ammonium perchlorate is preferred, and as a burning rate modifier an iron compound such as ferric oxide is preferred.

20 Claims, 4 Drawing Sheets

GAS GENERATOR COMPOSITION WITH AZIDOMETHYL GROUP AND IRON COMPOUND MODIFIER

BACKGROUND OF THE INVENTION

1. Field of the Invention

The present invention relates to a gas generator composition in use for propulsive engines such as air-breathing engines and hybrid rockets which employ solid fuels and liquid oxidizers.

2. Description of the Related Art

Fuels for air-breathing engines and those for rockets which include, separate from each other, an oxidizer and a fuel are generally required to have a self-combustible property, or the property that they decompose by themselves and burn. For this purpose, compositions used are those similar to the conventional solid propellants (See, for example, Propellants, Explosives, Pyrotechnics 16, 287–292 (1991)).

A first example of such propellants is the double-base propellants having as primary ingredients nitroglycerin and nitrocellulose with the amount of nitroglycerin therein being decreased. A second such example is the composite propellants containing reduced amounts of oxidizers used therefor such as salts of ammonium perchlorate, ammonium nitrate and the like. These propellants contain aliphatic polyesters having on their side chains self-decomposing functional groups such as azidomethyl group.

Similar techniques are disclosed in Japanese Examined Patent Publication No.7-25630, wherein aliphatic polyethers having azidomethyl groups on their side chains and hydroxyl groups on their terminals are used for ducted rockets.

However, gas generator composition containing reduced amounts of oxidizers in composite propellants have low combustibility by oxidation reactions. In particular, at pressures as low as 10 kgf/cm$^2$ and lower, the combustibility of said gas generators is low, and, in some instances, the combustion does not persist. Even when the combustion persists, the burning rate is low with said rate being highly dependent on pressure. Furthermore, the gas generator composition were disadvantageous because their burning rate was highly dependent on temperature. On the other hand, gas generator composition used for ducted rockets containing as a primary ingredient aliphatic polyethers having azidomethyl groups on their side chains and hydroxyl groups on their ends have high burning rates. However, the gas generator composition containing such polyethers alone as a primary ingredient have the burning rate which is highly dependent on pressure, and therefore have limited applications. In addition, the gas generator composition involved a problem that they do not stably burn at reduced pressures of 5 kgf/cm$^2$ or lower.

SUMMARY OF THE INVENTION

Accordingly, it is a primary objective of the present invention to provide a gas generator composition which stably burns at low pressure ranges and which has a high burning rate while maintaining such properties as a high specific impulse when employed for propulsive engines.

Another object of the invention is to provide a gas generator composition whose burning rate has low dependence on pressure and temperature.

BRIEF DESCRIPTION OF THE DRAWINGS

The features of the present invention that are believed to be novel are set forth with particularity in the appended claims. The invention together objects and advantages thereof may best be understood by reference to the following description of the presently preferred embodiments together with the accompanying drawings in which:

DETAILED DESCRIPTION OF THE PREFERRED EMBODIMENTS

Figure 1:
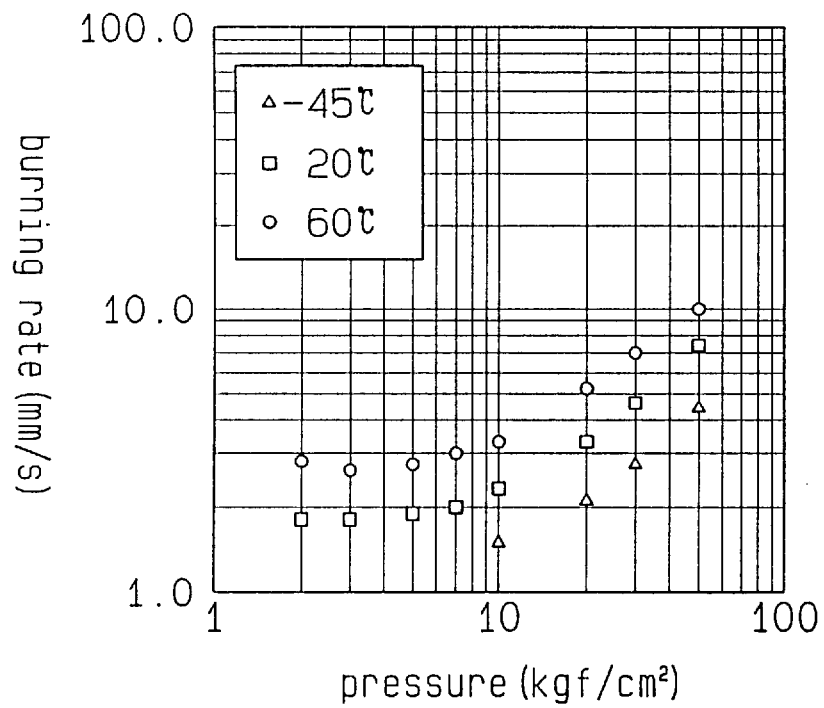
FIG. 1 is a graph showing the relationship between pressure and the burning rate described in Example 1.

The invention will be now described in detail as follows.

The aliphatic polyethers which constitute gas generator composition are compounds which have azidomethyl groups and hydroxyl groups. Examples of such aliphatic polyethers include the compounds represented by the following general formulas (1) and (2):

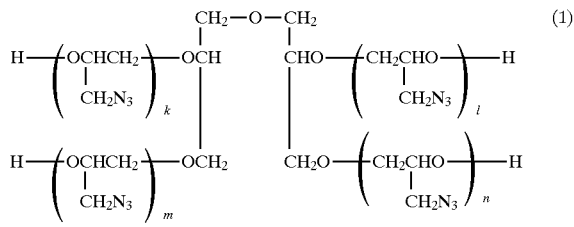

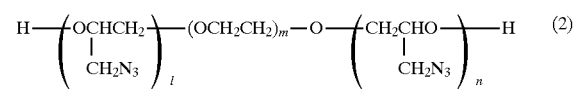

wherein part of the hydroxyl groups on the ends may be substituted with other functional groups or hydrogen, and k to n each represent an integer.

The aliphatic polyethers of the general formula (1) may, for example, be prepared as follows: a reaction catalyst is dissolved in diglycerin, and epichlorohydrin is addition-reacted therewith to give an aliphatic polyether having chloromethyl groups on its side chains and hydroxyl groups on its ends. The polyether thus obtained is then allowed to react with sodium azide in dimethylformamide to prepare the aliphatic polyether of the general formula (1). This method is disclosed in Japanese Examined Patent Publication No.7-508.

The polyethers of the general formula (2) may, for example, be prepared as follows: a reaction catalyst is dissolved in a diol such as ethylene glycol, and epichlorohydrin and ethylene oxide are addition-reacted therewith to give an aliphatic polyether having hydroxyl groups on its ends. The polyether thus obtained is then allowed to react with sodium azide to prepare the polyether of the general formula (2). This method is disclosed in Japanese Examined Patent Publication No.4-75877.

When ethylene glycol is replaced with α-monochlorohydrin in the aforementioned process, a polyether different from that of the general formula (2) may be obtained. These aliphatic polyethers are mixed into the gas generator composition in an amount of 60% by weight or more.

The curing agents are used to react with the above-mentioned polyethers to cure the latter. As the curing agents, polyfunctional isocyanates or polyisocyanates are used. Examples of these compounds include hexamethylene diisocyanate, isophorone diisocyanate, tolylene diisocyanate, polymethylene polyphenyl polyisocyanate and the like. The curing agent contains any of these compounds alone or in combination.

When a compound of the general formula (1) wherein three or more hydroxyl groups are used as a polyether described above, the preferred curing agent is hexamethylene diisocyanate. It is because the resultant gas generator will have an improved mechanical characteristics after being molded into a desired shape and it will also require less time for curing. When a compound of the general formula (2) having two or less functional groups are used as a polyether described above, preferably either a crosslinking agent or a curing agent comprising an isocyanate compound or a polyisocyanate compound having three or more functional groups is used. It is because the resultant gas generator composition will have improved mechanical characteristics based on the network structure thereof.

The content of the curing agent is preferably 5 to 15% by weight in the gas generator composition. When the content is less than 5% by weight, the gas generator composition becomes too soft, while when the content is over 15% by weight, it becomes too brittle.

The crosslinking agents are used to crosslink the aforementioned polyethers and curing agents to enhance the product's strength and improve the property of retaining the shape of the gas generator composition. As crosslinking agents polyols having three or more functional groups are used and preferably trimethylol propane or polyols having number average molecular weights of 1,000 or less are used. When the crosslinking agents are used, one agent alone or combinations of more than one agent are used. The content of the crosslinking agent is 0 to 5% by weight in the gas generator composition. When the content is over 5% by weight, the crosslinking density becomes high and the gas generator composition becomes brittle.

The curing catalysts are used to promote curing reactions. Examples of curing catalysts used include, organic tin compounds, organic bismuth compounds or amines. Among them the preferred organic tin compound is dibutyltin dilaurate and dibutyltin (2-ethylhexanoate) having a high catalytic activity. The preferred organic bismuth compound is triphenyl bismuth which has a long pot life and which can shorten the curing time. As the amines, triethylenediamine is preferred. When curing catalysts are used, one catalyst alone or combinations of more than one catalyst are used. The content of the curing catalyst is 0 to 0.1% by weight in the gas generator composition in order to properly promote the curing reactions.

The oxidizer are used to oxidize components comprising the above-mentioned polyethers, curing agents and the like to generate the desired gas. The preferred oxidizer include perchlorates, nitrates, nitric esters, nitro compounds and the like. The preferred compounds preferably include ammonium perchlorate as the perchlorate, ammonium nitrate as the nitrate, and triaminoguanidine nitrate as the nitric ester. The contents of the oxidizer are preferably 30% by weight or less in the gas generator composition, and more preferably it is 3 to 30% by weight.

The burning rate modifiers are used to promote oxidation reactions by oxidizer. The preferred burning rate modifiers include metal compounds. When perchlorates are used as the above oxidizer, the preferred metal compounds are iron compounds such as ferric oxide, ferrocene, bis (ethylferrocenyl)propane and the like. In order to attain proper adjustment of burning rate, the content of the burning rate modifiers is preferably 5% by weight or less, and more preferably 0.1 to 5% by weight.

As described above, the gas generator composition of the present invention comprises a particular polyether, curing agent, oxidizer, and burning rate modifier, so that it has a self-combustible property and can generate a gas which contains a large amount of fuel ingredients. The term "self-combustible" as used herein denotes that the compound, when ignited, can decompose and burn without external addition of an oxidizer or heat. Furthermore, since the burning rate modifier promotes the oxidation reaction by an oxidizer, the gas generator composition can stably burn at low pressure ranges and therefore can be used in a wide range of pressures.

Burning rate can be also enhanced by means of interaction of the oxidizer and the burning rate modifier. As a result, not only a large amount of gas can be readily obtained, but also the dependence of the burning rate on pressure and temperature can be minimized. Hence, the gas generator composition can exhibit a stable property over a wide range of conditions. In addition, based on the above characteristics the gas generator composition can be molded into any desired shape to make it suitable for purposes such as peripheral combustion, internal combustion and other purposes. That is, the degree of freedom of the shape design of the particulates of the gas generator composition can be made larger.

The present invention may be more fully understood from the following examples and comparative examples.

EXAMPLE 1

Preparation of a Gas Generator Composition

To 163.44 g of an aliphatic polyether of the general formula (1) having azidomethyl groups on its side chains and hydroxyl groups on its ends and 0.02 g of dibutyltin dilaurate as the curing catalyst, 20 g of ammonium perchlorate as the oxidizing agent and 2 g of ferric oxide as the burning rate modifier were added and mixed. Then, 14.54 g of hexamethylene diisocyanate as the curing agent was further added to the mixture, followed by mixing for 30 minutes to give a liquid mixture.

The liquid mixture was then poured into the desired mold, degassed in vacuum, and allowed to stand till the curing reaction progressed. Thereafter, the solid gas generator of the composition shown in Table 1 was obtained.

Combustion Test

Using the gas generator composition thus obtained, the combustion test was conducted as described below.

A strand test strip was made by fabricating the above gas generator into a stick of 7 mm×7 mm×80 mm and then applying melamine resin on its surface. The test was conducted on this strip using the chimney-type strand testing apparatus. The chimney strand testing apparatus is a device wherein the supplied gas, the generated gas and the discharged gas are on balance so that the test is conducted on a stable condition. The testing conditions were set at various conditions of the range of 1 to 50 kgf/cm$^2$ for nitrogen gas pressure or −45° to 60° C. for the initial temperature. The burning rate was measured as a function of the pressure and the initial temperature. The result of the test is shown in FIG. 1.

EXAMPLE 2 to 6

In a similar procedure to Example 1, the gas generators of compositions shown in Examples 2 to 4 in Table 1 were prepared.

Figure 2:
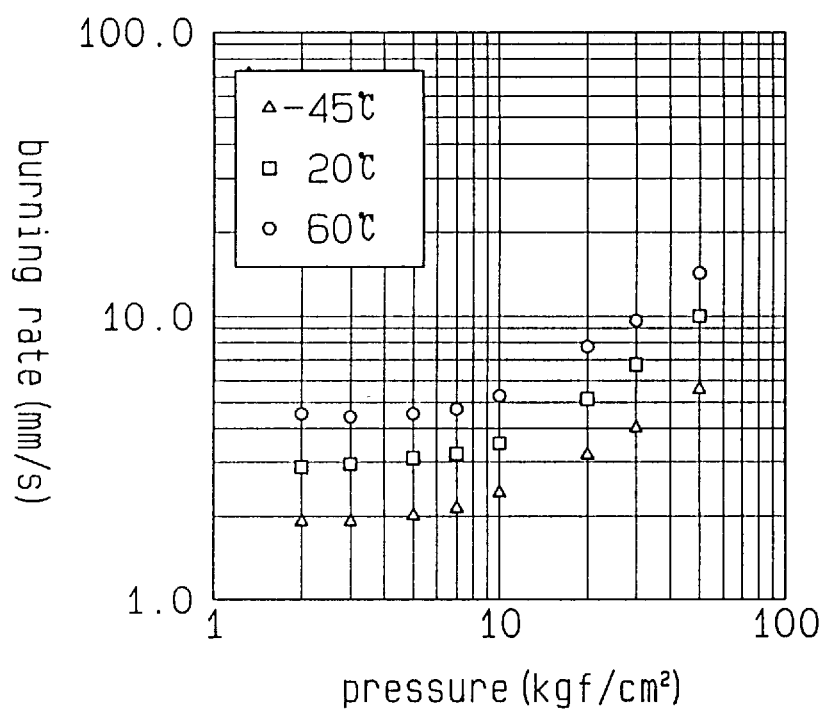
FIG. 2 is a graph showing the relationship between pressure and the burning rate described in Example 2.

The same combustion test as shown in Example 1 was conducted for each gas generator composition. The test result of Example 2 is shown in FIG. 2, that of Example 3 in FIG. 3, that of Example 4 in FIG. 4, that of Example 5 in FIG. 5, and that of Example 6 in FIG. 6.

Comparative Example 1

In a similar procedure to Example 1, the gas generator of the composition shown in Comparative example 1 in Table 1 was prepared.

Figure 7:
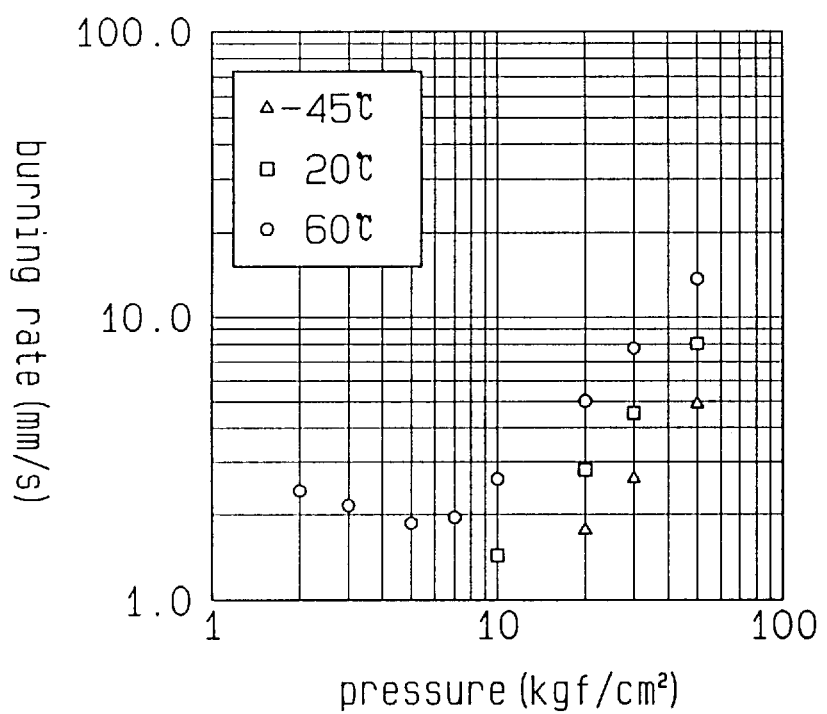
FIG. 7 is a graph showing the relationship between pressure and the burning rate described in Comparative example 1.

The same combustion test as shown in Example 1 was conducted for this gas generator. The test result of Comparative example 1 is shown in FIG. 7.

generator composition did not persist. It is apparent from this result that the burning rate at the low pressure range can be improved by the addition of ferric oxide.

Furthermore, since the amount of ferric oxide was further increased in Example 2 shown in FIG. 2, the burning rate at 20° C. and 10 kgf/cm$^2$ further increased to 3.6 mm/s, and the pressure exponent further decreased to 0.31. The temperature sensitivity was 0.75%/°C., slightly lower than in Example 1, and it burned stably in the whole range of pressure and temperature tested. It is apparent from this result that by increasing the amount of ferric oxide, the burning rate at the low pressure range can be greatly improved.

Figure 3:
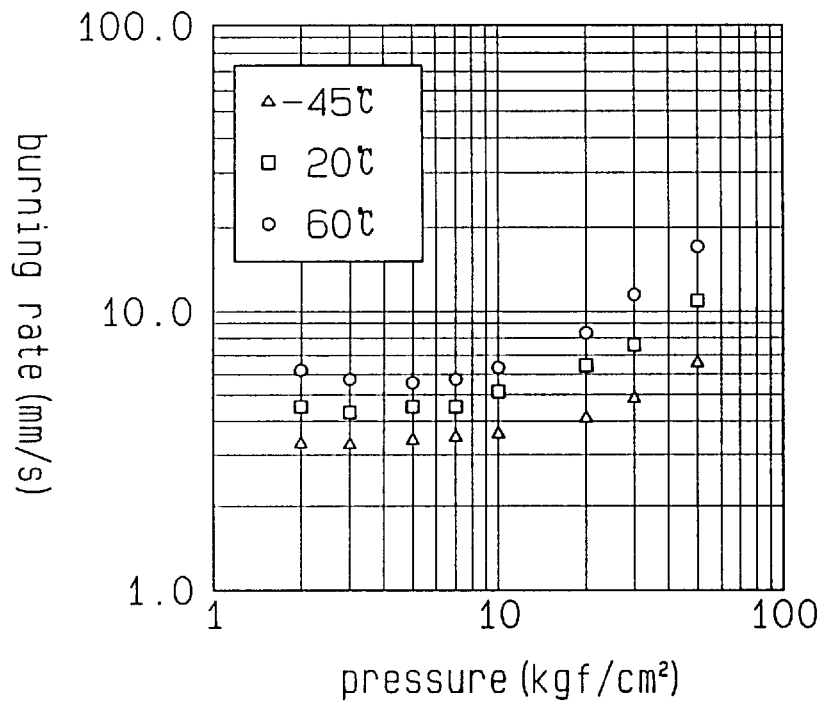
FIG. 3 is a graph showing the relationship between pressure and the burning rate described in Example 3.
Figure 4:
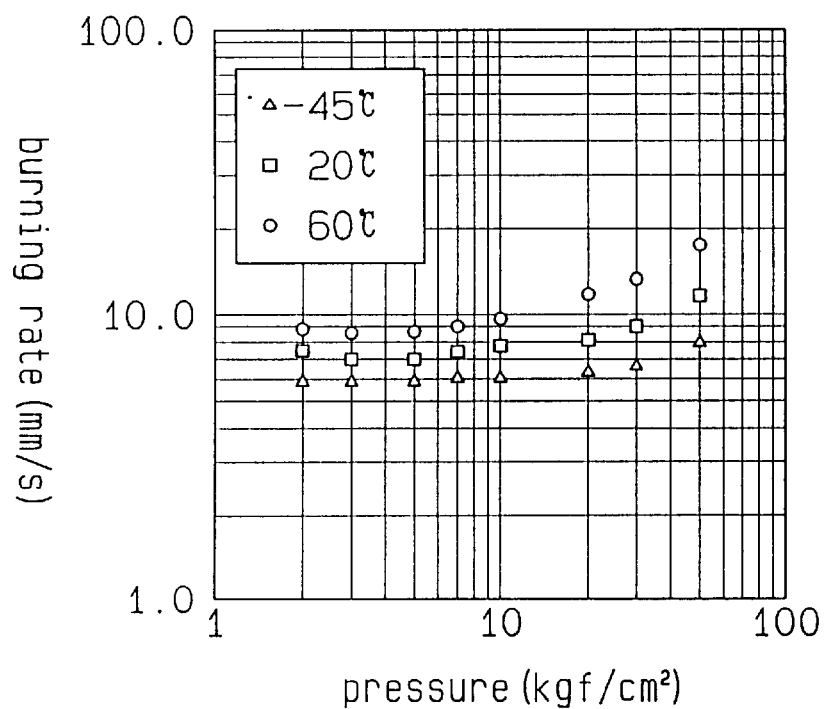
FIG. 4 is a graph showing the relationship between pressure and the burning rate described in Example 4.

Furthermore, since 1% by weight of bis(ethylpherocenyl)propane was added as the burning rate modifier in Example 3 shown in FIG. 3, the burning rate at 20° C. and 10 kgf/cm$^2$ was 4.8 mm/s and the pressure exponent of the burning rate was about 0.21. Thus, the burning rate was increased and its pressure exponent was decreased in Example 3 as compared to Comparative example 1. The temperature sensitivity of the burning rate was about 0.52%/°C. It is apparent from this result that bis(ethylpherocenyl)propane has a greater effect on the burning rate than ferric oxide.

TABLE 1

|  |  | Example 1 | Example 2 | Example 3 | Example 4 | Example 5 | Example 6 | Comparative example 1 |
|---|---|---|---|---|---|---|---|---|
| Composition of gas generator (wt %) | Polyether (1) | 81.72 | 79.89 | 81.72 | 79.89 | — | — | 82.64 |
|  | Polyether (2) | — | — | — | — | 75.49 | 75.49 | — |
|  | HMDI | 7.27 | 7.10 | 7.27 | 7.10 | 10.67 | 10.67 | 7.35 |
|  | TMP | — | — | — | — | 2.38 | 2.38 | — |
|  | AP | 10.00 | 10.00 | 16.00 | 10.00 | 10.00 | 10.00 | 10.00 |
|  | Ferric oxide | 1.00 | 3.00 | — | — | 1.00 | — | — |
|  | BEFP | — | — | 1.00 | 3.00 | — | 1.00 | — |
|  | DBTDL | 0.01 | 0.01 | 0.01 | 0.00 | 0.01 | 0.01 | 0.01 |

In Table 1, polyether (1) is the one represented in the above-mentioned general formula (1) and polyether (2) is the one represented in the above-mentioned general formula (2); HMDI is hexamethylene diisocyanate; TMP is trimethylolpropane; AP is ammonium perchlorate; BEFP is bis(ethylpherocenyl)propane; and DBTDL is dibutyltin dilaurate.

The pressure exponent denotes a slope at any point of the curve connecting each measurement point in a graph showing a relationship of pressure and the burning rate on a log-log paper. This values can be determined by calculation. It means that when the value becomes larger, the change of the burning rate with pressure becomes gradually greater.

Description of Test Results

In Comparative example 1 shown in FIG. 7, the gas generator was burned at 20° C. and 10 kgf/cm$^2$, but the burning rate was slow at 1.4 mm/s and the pressure exponent of the burning rate was high at about 1.0.

In contrast, in Example 1 shown in FIG. 1, 1% by weight of ferric oxide was added as the burning rate modifier so that the burning rate at 20° C. and 10 kgf/cm$^2$ increased to 2.3 mm/s and the pressure exponent of the burning rate decreased to about 0.38. The temperature sensitivity of the burning rate was about 0.78% /°C. At −45° C. and at a pressure of 7 kgf/cm$^2$ and lower, the combustion of the gas Furthermore, since the amount of bis(pherocenyl)propane was increased in Example 4 shown in FIG. 4, the burning rate at 20° C. and 10 kgf/cm$^2$ was 7.5 mm/s, and the pressure exponent was 0.07. In this Example 4 the burning rate was higher and the pressure exponent was lower than in Example 3. The temperature sensitivity was 0.46%/°C., slightly lower than in Example 3. It is apparent from this result that by increasing the amount of bis(pherocenyl)propane the burning rate at the low pressure range can be greatly improved.

Figure 5:
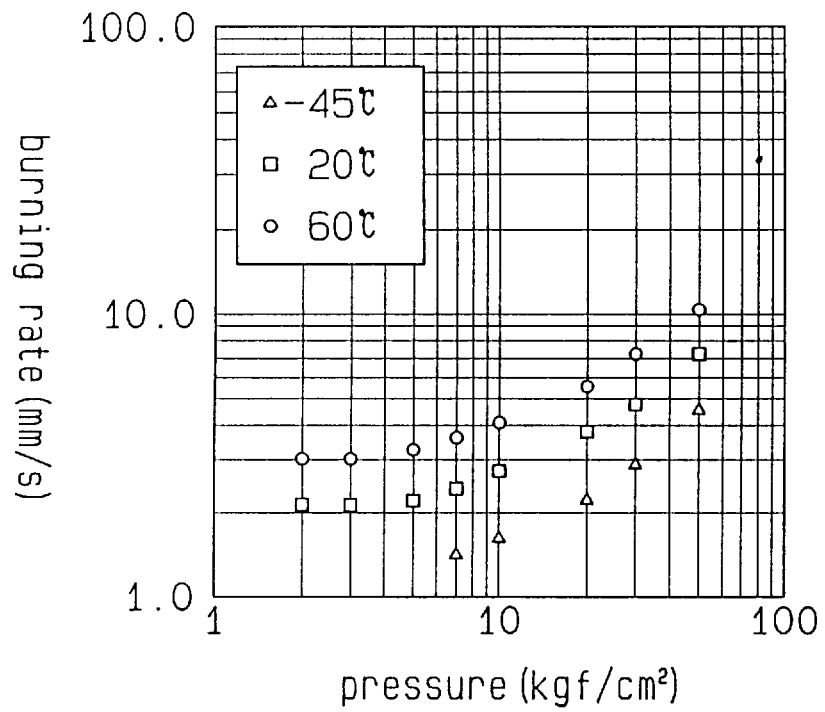
FIG. 5 is a graph showing the relationship between pressure and the burning rate described in Example 5.
Figure 6:
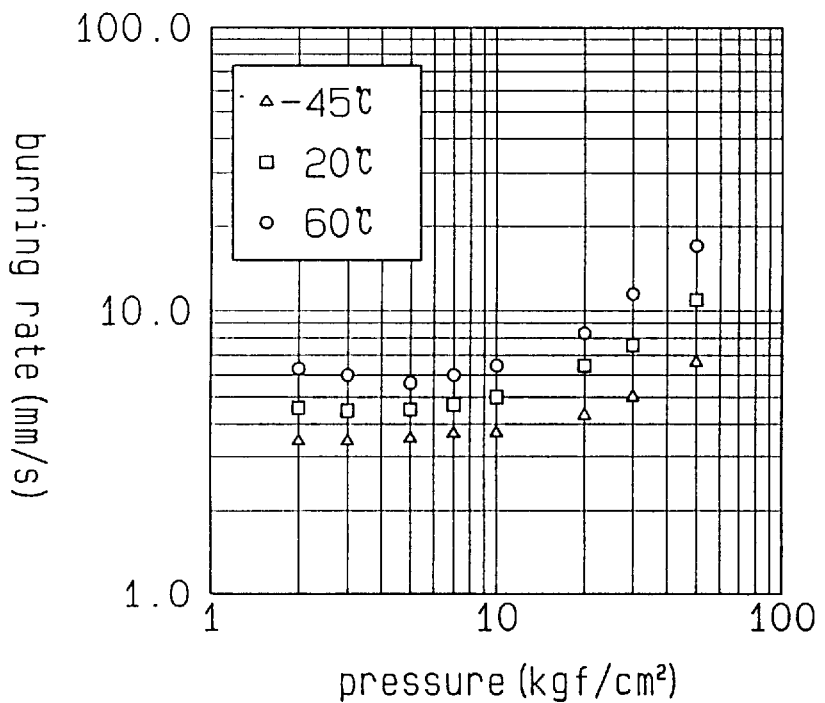
FIG. 6 is a graph showing the relationship between pressure and the burning rate described in Example 6.

In Example 5 shown in FIG. 5 and in Example 6 shown in FIG. 6, an aliphatic polyether of the general formula (2) was used as such. In Example 5 the burning rate at 20° C. and 10 kgf/cm$^2$ was 2.8 mm/s, the pressure exponent of the burning rate was about 0.42, and the temperature sensitivity of the burning rate was about 0.90%/°C. In Example 6 the burning rate at 20° C. and 10 kgf/cm$^2$ was 5.0 mm/s and the pressure exponent of the burning rate was about 0.25, the temperature sensitivity of the burning rate was about 0.52%/°C.

These values are close to those in Example 1 and Example 3. When the polyether of the general formula (2) was used, the characteristics of burning rate was improved by the effects of the oxidizer and the burning rate modifier as when the polyether of the general formula (1) was used.

As hereinabove described, the gas generator of the present invention burns stably and has an enhanced burning rate at the low pressure range with its performance such as specific impulse being maintained when used in the propulsive engine. In addition, the burning rate of the gas generator has a reduced dependence on pressure and temperature.

Although some embodiments of the present invention has been described herein, it should be apparent to those skilled in the art that the present invention may be embodied in many other specific forms without departing from the spirit or scope of the invention.

Therefore, the present embodiments are to be considered as illustrative and not restrictive and the invention is not to be limited to the details given herein, but may be modified within the scope of the appended claims.

What is claimed is:

1. A gas generator composition comprising:
   aliphatic polyether having an azidomethyl group and a hydroxyl group;
   a curing agent for curing the aliphatic polyether;
   an oxidizer for oxidizing the aliphatic polyether and the curing agent to generate the gas; and
   a burning rate modifier for promoting the oxidation reaction of the oxidizer with the aliphatic polyether and the curing agent, said gas generator composition containing between about 0.1% to about 5% by weight of a burning rate modifier including an iron compound.

2. A gas generator composition according to claim 1, wherein said polyether is represented by the following general formula (1):

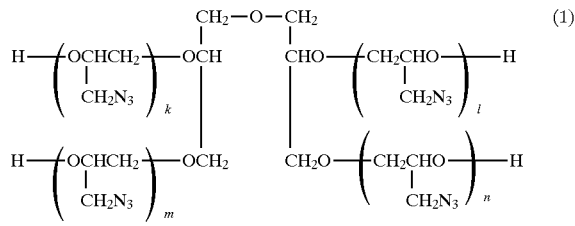

wherein part of the hydroxyl groups contained in the polyether is substitutable with another functional groups or hydrogen, and k to n each represents an integer.

3. A gas generator composition according to claim 1, wherein said polyether is represented by the following general formula (2):

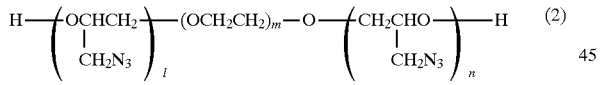

wherein part of the hydroxyl groups located in the polyether is substitutable with another functional groups or hydrogen, and 1 and n each represents an integer.

4. A gas generator composition according to claim 1, wherein said gas generator composition contains more than 60% by weight of said polyether.

5. A gas generator composition according to claim 1, wherein said curing agent includes polyfunctional isocyanate or polyisocyanate.

6. A gas generator composition according to claim 5, wherein said curing agent includes hexamethylene diisocyanate.

7. A gas generator composition according to claim 5, wherein said gas generator composition contains 5 to 15% by weight of the curing agent.

8. A gas generator composition according to claim 1, wherein said oxidizer includes perchlorate, nitrate, nitric ester or nitro compound.

9. A gas generator composition according to claim 8, wherein said oxidizer contains a perchlorate radical.

10. A gas generator composition according to claim 9, wherein said gas generator composition contains 3 to 30% by weight of ammonium perchlorate.

11. A gas generator composition according to claim 8, wherein said oxidizer contains a nitrate radical.

12. A gas generator composition according to claim 1, wherein said iron compound includes ferric oxide, ferrocene or bis(ethylferrocenyl)propane.

13. A gas generator composition comprising:
    aliphatic polyether having an azidomethyl groups and a hydroxyl group;
    a curing agent for curing the aliphatic polyether;
    an oxidizer for oxidizing the aliphatic polyether and the curing agent to generate the gas;
    an iron compound burning rate modifier for promoting the oxidation reaction of the oxidizer with the aliphatic polyether and the curing agent, said gas generator composition containing between about 0.1% to about 5% by weight of said iron burning rate modifier; and
    a crosslinking agent for crosslinking the polyether and the curing agent.

14. A gas generator composition according to claim 13, wherein said crosslinking agent includes polyol having three or more functional groups.

15. A gas generator composition according to claim 14, wherein said crosslinking agent includes trimethylol propane or polyol having the number average molecular weight of 1000 or less.

16. A gas generator composition according to claim 13, wherein said gas generator composition contains from greater than 0 to 5% by weight of the crosslinking agent.

17. A gas generator composition comprising:
    aliphatic polyether having an azidomethyl group and a hydroxyl group;
    a curing agent for curing the aliphatic polyether;
    an oxidizer for oxidizing the aliphatic polyether and the curing agent to generate the gas;
    an iron compound burning rate modifier for promoting the oxidation reaction of the oxidizer with the aliphatic polyether aid the curing agent, said gas generator composition containing between about 0.1% to about 5% by weight of said iron burning rate modifier; and
    a curing catalyst for promoting the curing reaction of the aliphatic polyether with the curing agent.

18. A gas generator composition according to claim 17, further comprising a crosslinking agent to crosslink the polyether and the curing agent.

19. A gas generator composition according to claim 18, wherein the curing catalyst includes an organic tin compound, an organic bismuth compound or an amine compound.

20. A gas generator composition according to claim 11, wherein said nitrate is ammonium nitrate.

* * * * *